US011175169B2

(12) United States Patent
Zimmerman

(10) Patent No.: US 11,175,169 B2
(45) Date of Patent: Nov. 16, 2021

(54) SYSTEMS FOR CONNECTING A CENTRAL MODULE TO A NETWORK AND RELATED CONNECTORS

(71) Applicant: Sensus Spectrum, LLC, Morrisville, NC (US)

(72) Inventor: Michael Zimmerman, Addison, PA (US)

(73) Assignee: Sensus Spectrum, LLC, Morrisville, NC (US)

( * ) Notice: Subject to any disclaimer, the term of this patent is extended or adjusted under 35 U.S.C. 154(b) by 102 days.

(21) Appl. No.: 16/554,912

(22) Filed: Aug. 29, 2019

(65) Prior Publication Data

US 2021/0063224 A1 Mar. 4, 2021

(51) Int. Cl.
*G01F 15/18* (2006.01)
*E03B 7/09* (2006.01)
*E03B 7/07* (2006.01)
*G01F 15/14* (2006.01)

(52) U.S. Cl.
CPC ............ *G01F 15/185* (2013.01); *E03B 7/072* (2013.01); *E03B 7/095* (2013.01); *G01F 15/14* (2013.01); *G01F 15/18* (2013.01)

(58) Field of Classification Search
CPC ........ G01F 15/185; G01F 15/18; G01F 15/14; E03B 7/072; E03B 7/095

USPC ........................................................ 73/201
See application file for complete search history.

(56) References Cited

U.S. PATENT DOCUMENTS

| 10,651,572 | B1* | 5/2020 | White | F16L 25/01 |
| 2009/0188313 | A1* | 7/2009 | Ball | G01F 3/12 |
| | | | | 73/201 |
| 2010/0116065 | A1* | 5/2010 | Mecke | G01F 15/185 |
| | | | | 73/861.11 |
| 2011/0108136 | A1* | 5/2011 | Margalit | G01F 15/14 |
| | | | | 137/343 |
| 2014/0260664 | A1* | 9/2014 | Gledhill, III | G01F 15/14 |
| | | | | 73/861.18 |
| 2015/0276437 | A1* | 10/2015 | Palmiscno | G01D 11/30 |
| | | | | 73/866.5 |
| 2018/0216978 | A1* | 8/2018 | Dames | G01F 15/18 |

* cited by examiner

*Primary Examiner* — Clayton E. LaBalle
*Assistant Examiner* — Kevin C Butler
(74) *Attorney, Agent, or Firm* — Stanek Lemon Crouse & Meeks, PA

(57) ABSTRACT

A system for connecting a central module to a network is provided. The system includes a central module having an inlet and an outlet; a first connector configured to be received at the inlet of the central module; a second, connector configured to be received at the outlet of the central module; and at least one fastening mechanism configured to secure the first and second connectors to the central module such that a sealed connection is provided through the central module to the network.

20 Claims, 6 Drawing Sheets

SYSTEMS FOR CONNECTING A CENTRAL MODULE TO A NETWORK AND RELATED CONNECTORS

FIELD

The present inventive concept relates generally to connectors and, more particularly, to non-conventional methods of connecting modules to a network.

BACKGROUND

In the past copper piping was a standard material used for water distribution piping. Conventional meters in the United States and abroad utilize, for example, a threaded and gasketed connection to connect the meter to, for example, the water distribution system. In other words, a male connection is positioned in a female connector using a threaded connector and this connection is generally sealed with a rubberized gasket. This process has remained relatively stable for the last 40 or more years. Modern piping is moving away from copper piping and various plastics and other materials may be used.

SUMMARY

Some embodiments of the present inventive concept provide a system for connecting a central module to a network. The system includes a central module having an inlet and an outlet; a first connector configured to be received at the inlet of the central module; a second, connector configured to be received at the outlet of the central module; and at least one fastening mechanism configured to secure the first and second connectors to the central module such that a sealed connection is provided through the central module to the network.

In further embodiments, the central module may be a water meter and the network may be a water distribution network. In certain embodiments, the water distribution network may include metal or non-metal piping and the first and second connectors may include elastomeric materials or other means of sealing.

In still further embodiments, the first and second connectors may be different type of connectors.

In some embodiments, the fastening mechanism may include one of a plurality of pins and a plurality of openings. The first and second connectors may include a remaining one of the plurality of pins and the plurality of openings. The plurality of pins may be configured to be received by the plurality of openings such that the fastening mechanism couples the first and second connectors to the central module.

In further embodiments, one of the first and second connectors may include a notch and a remaining one of the first and second connectors may include a tab. The notch may be configured to receive the tab to enable coupling of the first and second connectors to the central module.

In still further embodiments, the first and second connectors may be further configured to seal connections between the first and second connectors and the inlet and outlet, respectively. In certain embodiments, an o-ring may be positioned with each of the first and second connectors to provide a seal.

In some embodiments, the first and second connectors may be non-threaded connectors.

In further embodiments, the first and second connectors may be configured to vary a length of a connection to the network.

Still further embodiments of the present inventive concept provide a connector for connecting a central module to a network including a material configured to be received at an inlet and/or an outlet of the central module. At least one fastening mechanism is configured to secure the connector to the central module such that a sealed connection is provided through the central module to the network.

DETAILED DESCRIPTION

Figure 1:
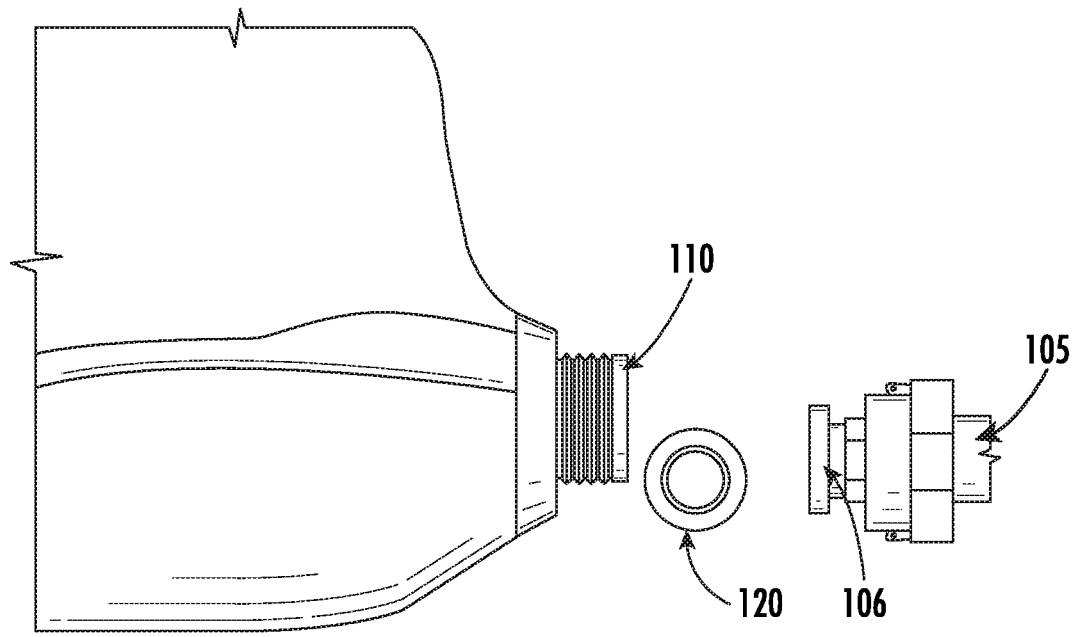
FIG. 1 is a diagram illustrating an exploded coupling system for a conventional meter.
Figure 2:
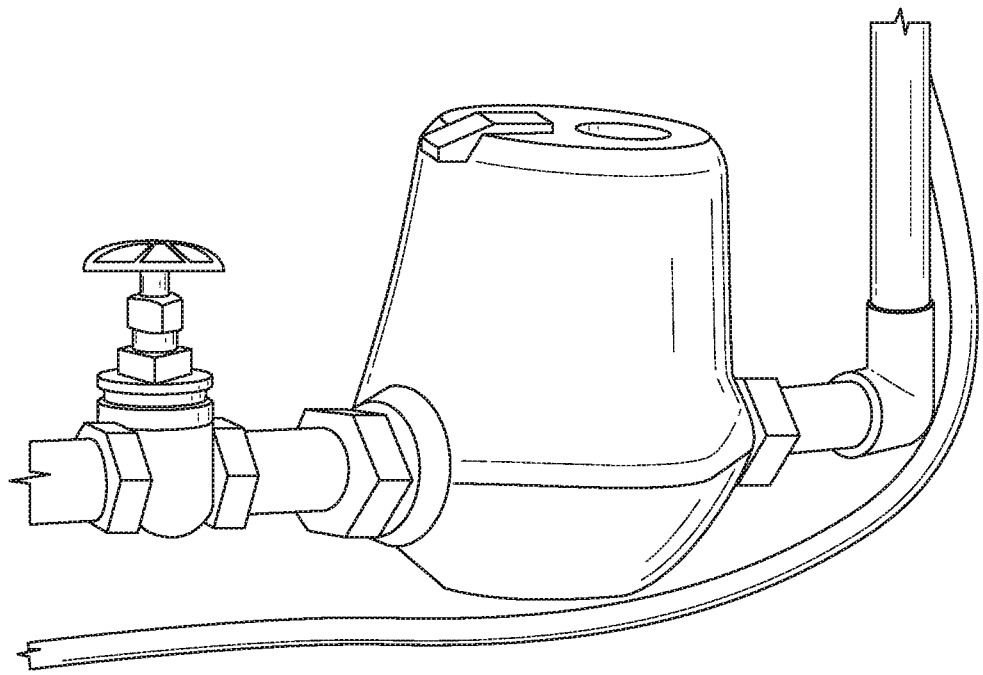
FIG. 2 is a diagram illustrating a fully coupled conventional meter.

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Figure 3A:
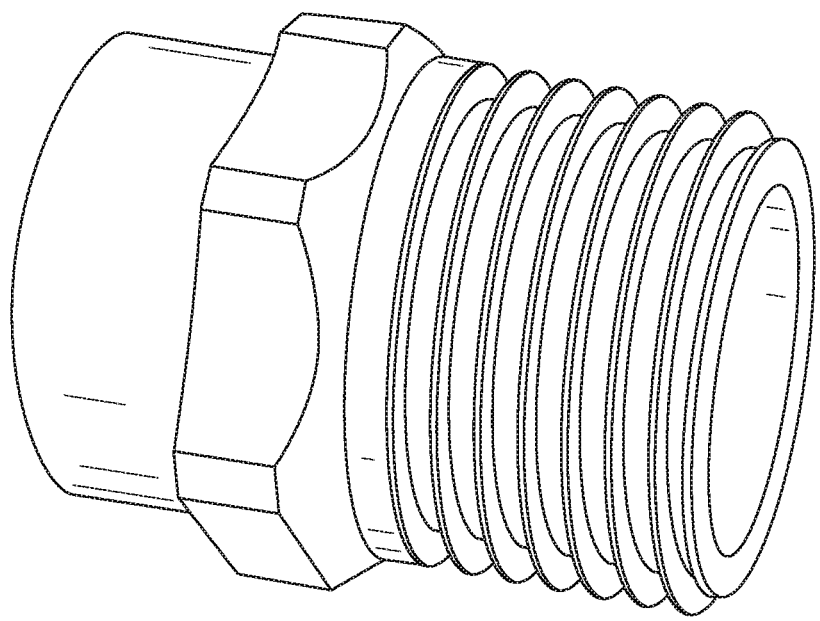
FIG. 3A is a diagram of a conventional copper male threaded connector.
Figure 3B:
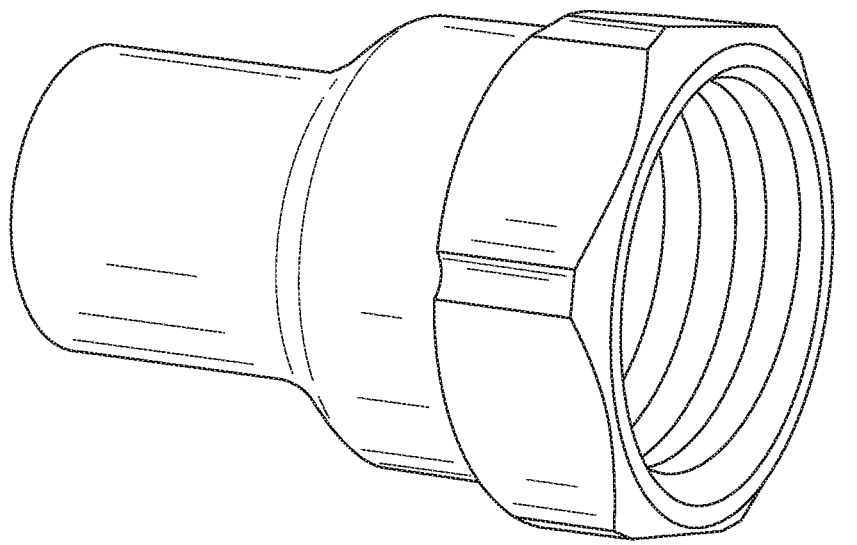
FIG. 3B is a diagram of a conventional copper female copper connector.

As discussed in the background of the inventive concept, conventional meters in the United States and abroad utilize, for example, a threaded and gasketed connection to connect the meter to, for example, the water distribution system. Example conventional connectors and systems are illustrated in FIGS. 1 through 3A. As illustrated in FIG. 1, a threaded meter end 110 may be coupled to a copper pipe 105 having a coupling nut 106 thereon. The threaded meter end 110 may be positioned in the coupling nut 106 with a rubberized gasket 120 therebetween, thus coupling and sealing the meter to the copper pipe 105. Element 111 of FIG. 3A is another example of a threaded male portion that may be received by a female connector 116 of FIG. 3B. Although these figures depict the piping in various materials, any materials suitable may be used. Once the elements are fitting together, they may also be glued. The fully coupled system is illustrated in, for example, FIG. 2.

As discussed above, the availability of new materials, for example, thermoplastic materials, for piping provide replacement materials for the traditional copper for water pipes. It is understood that the materials used should be suitable to handle high temperatures for hot water as well as the necessary pressure of the water in the piping. Materials in addition to copper that may be available include polybutylene (PB); chlorinated polyvinylchloride (CPVC); polyvinylchloride PVC); random polypropylene (PP-R), cross-linked polyethylene (PEX) and the like. Introduction of pipes made of these new materials may remove the need for a traditional threaded pipe connection discussed above. Accordingly, some embodiments of the present inventive concept provide alternative attachment systems for connecting piping made of alternate materials as will be discussed further below with respect to FIGS. 4 through 7.

In particular, with the advent of new plumbing materials and moving away from copper pipe in many households, alternative connectors and connection styles may be used. For example, in some embodiments water meters may designed to have interchangeable connector ends at the connection points to the water line. In other words, water meters may be designed to be connected to the water line using various types of connections, i.e., either conventional or in accordance with embodiments discussed herein. Thus, the meters allow for the new attachment methods discussed herein, such as PEX type connections or push to connect fittings, as well as the conventional threaded and gasketed connection.

The meters themselves are currently being manufactured out of polymers for use in a world dominated by metallic components and installers that want the robustness of metal components. One of the primary complaints of the polymer based meters is the thread strength of the polymer connectors and issues with stripping threads. Embodiments of the present inventive concept may provide alternate methods of connecting the piping, which may reduce, or possibly eliminate, the complaints with respect to thread strength and stripping as well as decrease installation time and issues with leaking meters due to improper installations.

It will be understood that although embodiments of the present inventive concept are discussed herein with respect to water meters, embodiments of the present inventive concept are not limited thereto. Connection systems and methods discussed herein may be applied in other systems without departing from the scope of the present inventive concept. For example, embodiments of the present inventive concept may be used in house installations, sub-metering installations and the like without departing from the scope of the present inventive concept.

Figure 4:
FIG. 4 is simple block diagram of a system including connectors in accordance with some embodiments of the present inventive concept.

Referring now to FIG. 4, a simple block diagram of a system including connectors in accordance with some embodiments of the present inventive concept will be discussed. As illustrated in FIG. 4, the system includes a central measuring module 450 having an inlet 452 and an outlet 454 and connectors 460, 465 in accordance with some embodiments of the present inventive concept. In some embodiments, the central measuring unit 450 may be a water meter, however, embodiments of the present inventive concept are not limited to this configuration. In these embodiments, water may flow in through the inlet 452 and out through the outlet 454. The meter may be any water meter without departing from embodiments of the present inventive concept. For example, the water meter may be a smart water meter that has the ability to communicate information to a remote location, for example, the utility.

The central measuring module 450 is configured to attach to, for example, the water distribution system using non-traditional connectors 460, 465 in accordance with embodiments discussed herein. These connectors 460, 465 may attach and seal to interchangeable ends using, for example, o-rings or other sealing devices. The connectors 460, 465 may be attached in any feasible way using, for example, quarter turn interfaces or the like as well as mechanical fasteners. In some embodiments, the modular ends may simulate the size and form factors required for integration with the connectors, for example, PEX connectors, push to connect fittings and other similar processes. In some embodiments, the connectors may be configured to allow for varying the overall length of the product based on the installation requirements.

Figure 5:
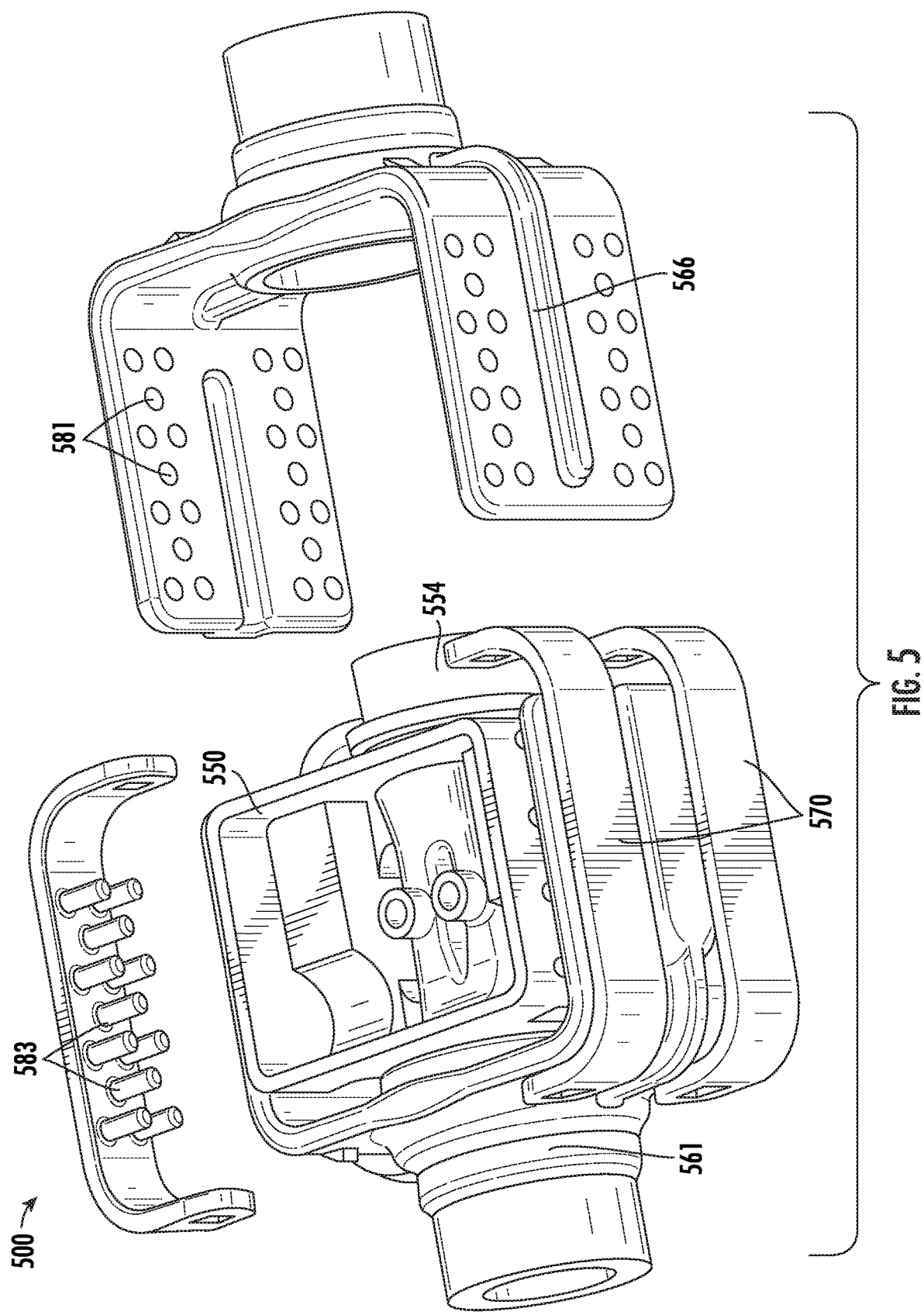
FIG. 5 is a diagram of a connector system in accordance with some embodiments of the present inventive concept.
Figure 6:
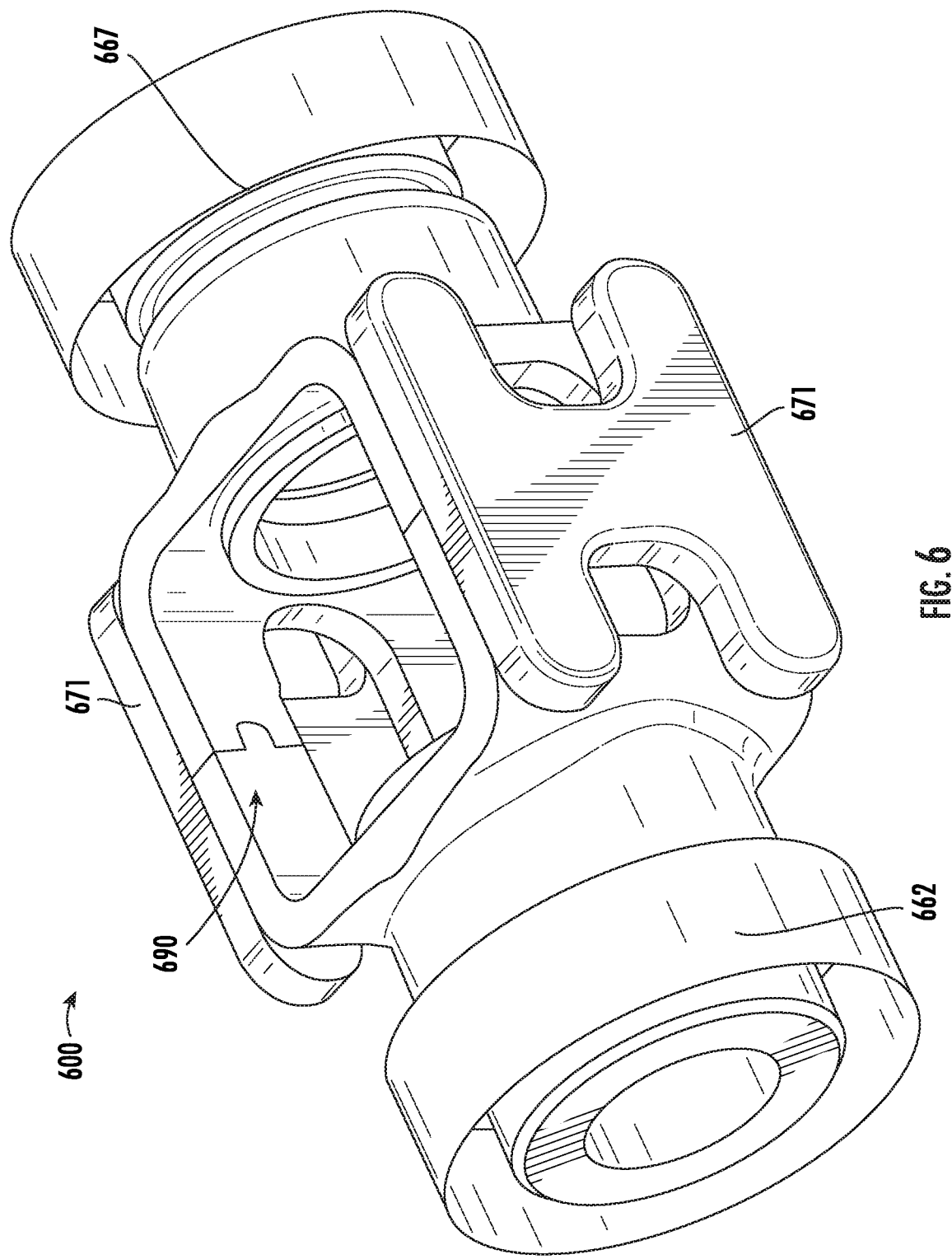
FIG. 6 is a diagram of a connector system in accordance with some embodiments of the present inventive concept.
Figure 7:
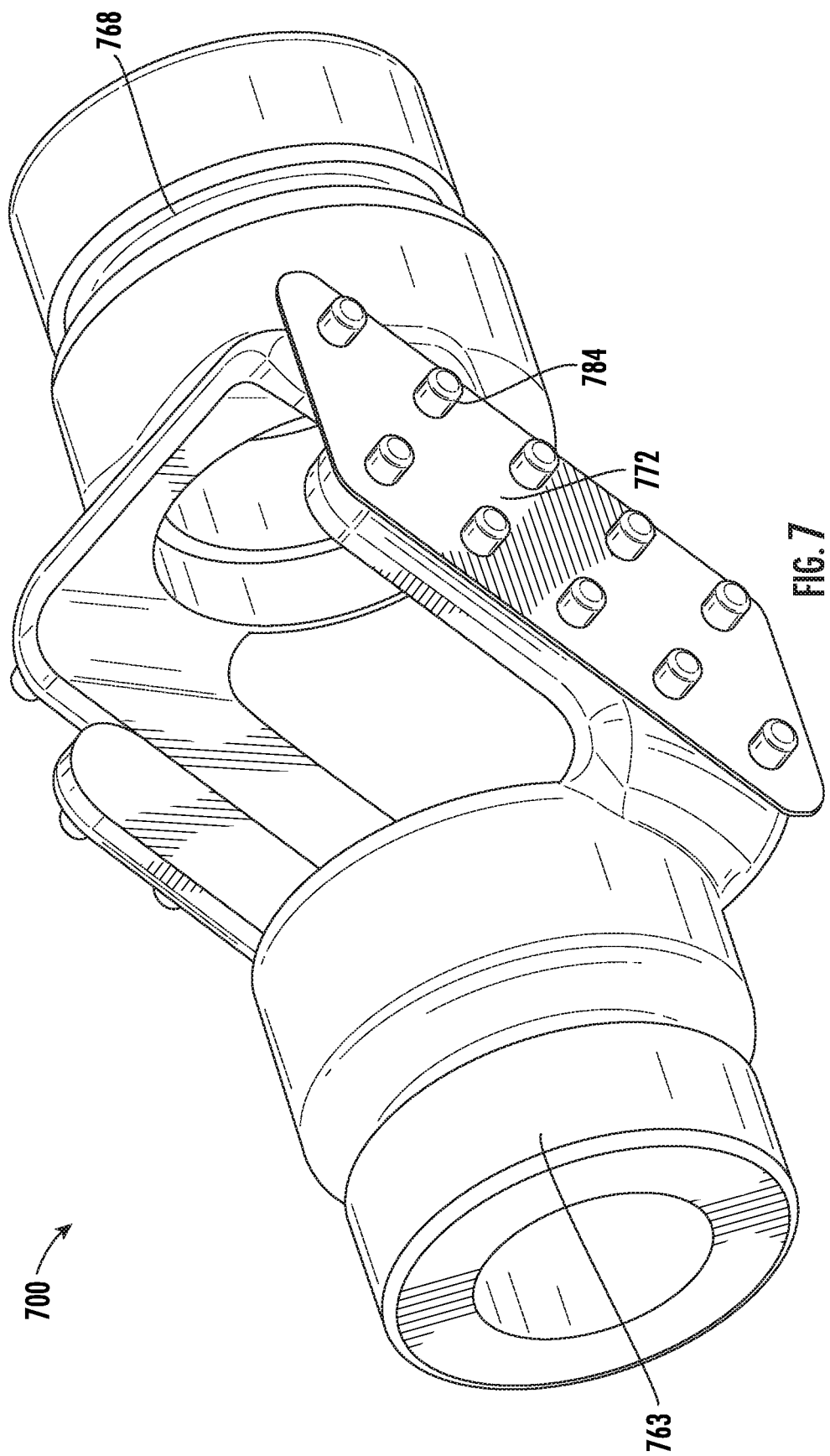
FIG. 7 is a diagram of a connector system in accordance with some embodiments of the present inventive concept.

Referring now to FIGS. 5 through 7, example embodiments of connectors in accordance with embodiments of the present inventive concept will be discussed. Referring first to FIG. 5, a system 500 in accordance with some embodiments of the present inventive concept will be discussed. The system includes central measuring module 550, a first connector 561, a second connector 566 and one or more fastening mechanisms 570. The central measuring module 550 may be an actual metrology section and, in some embodiments, is a water meter that is fully capable of measuring water flow.

In these embodiments, the water meter has an inlet (452, FIG. 4) and an outlet 554. The connectors 561 and 566 are configured to be positioned over the inlet and the outlet 554, respectively, as shown in FIG. 5. The connectors 561 and 566 may be made of various materials including, elastomeric materials, plastic materials or even metal materials. An elastomer is a natural or synthetic polymer having elastic/rubber-like properties. Some embodiments of the present inventive concept include elastomeric materials, which may be alloys used as rubber, latex and silicone substitutes. Thus, the connectors may be malleable, i.e. a material that is able to regain its original shape when a load/pressure is removed from the material. The connectors 561 and 566 may also seal the connection between the module 550 and the water distribution system. The seal may be achieved with o-rings in some embodiments. As used herein, an o-ring refers to a gasket in the form of a ring with a circular cross section, typically made of pliable material, used to seal connections in pipes, tubes, and the like. It will be understood that other sealing mechanisms may be used without departing from the scope of the present inventive concept.

Furthermore, the connectors 561 and 566 may be the same type of connector or may be completely different without departing from the scope of the present inventive concept. Thus, the connectors 561 and 566 may be selected to suit the connector on the module 550. The connectors 561 and 566 may be customized to different meter lengths and/or alternate meter connection types outside of the standard straight pipe threads with gaskets.

In embodiments illustrated in FIG. 5, the connectors 561 and 566 are provided with a series of openings 581 therein. One or more fastening mechanisms 570 are provided with a series of pins 583 in a pattern corresponding to the series of openings 581 in the connectors 561 and 566. The pins 583 are positioned through the series of openings 581 to secure the connectors 561 and 566 to the module 500. In other words, the pins 583 in the fastening mechanisms 570 may pressed through the openings 581 in the connectors 561 and 566 to secure the connectors 561 and 566 to the module 550. It will be understood that the system illustrated in FIG. 5 is provided for example only and that embodiments of the present inventive concept are not limited to the configuration illustrated therein.

Although embodiments of the present inventive concept are discussed with respect to FIG. 5 as being fasted with pins, embodiments of the present inventive concept are not limited to this configuration. For example, bolts or rivets may be used or the pieces could simply be welded together.

Referring now to FIG. 6, a connection system in accordance with some embodiments of the present inventive concept will be discussed. As illustrated in FIG. 6, the system 600 includes a first connector 662, a second connector 667 and a plurality of fastening mechanisms 671. The central measuring module is not illustrated in FIG. 6, but would be positioned between the connectors 662 and 667 similar to the central measuring module 550 of FIG. 5. The connectors 662 and 667 may include metal materials or polymer materials without departing from the scope of the present inventive concept.

As illustrated in FIG. 6, the connectors 662 and 667 are configured to notch together 690. In other words, one of the connectors has a notch (667 in FIG. 6) and one of the connectors has a tab (662 in FIG. 6) and the tab fits into the notch to hold the connectors 662 and 667 together. As further shown in FIG. 6, a fastening mechanism 671 is positioned over the connectors 662 and 667 to hold the connectors in place on the module. The fastening mechanism 671 may be performed by any means. For example, the connectors 662 and 667 may have openings similar to those discussed above with respect to FIG. 5 and the fastening mechanism 671 may have pins similar to those discussed above with respect to FIG. 5. Thus, the pins positioned in the openings may couple the connectors 662 and 667 to the module.

Referring now to FIG. 7, a connector system in accordance with some embodiments of the present inventive concept will be discussed. As illustrated in FIG. 7, the system 700 includes a first connector 763, a second connector 768 and a plurality of fastening mechanisms 772. The central measuring module is not illustrated in FIG. 7, but would be positioned between the connectors 763 and 768 similar to the central measuring module 550 of FIG. 5. The connectors 763 and 768 may include metal materials or polymer materials without departing from the scope of the present inventive concept.

As illustrated in FIG. 7, the connectors 763 and 768 are configured align diagonally. Although, not shown, the connectors 763 and 768 include a plurality of openings therein. The fastening mechanism 772 includes a series of pins 784 configured to be positioned in the openings in the connectors 763 and 768 to hold the connectors together and position the connector on the module (not shown).

It will be understood that embodiments of the present inventive concept illustrated in FIGS. 5 through 7 are provided as example only and, therefore, embodiments of the present inventive concept are not limited thereto.

As briefly discussed above, embodiments of the present inventive concept provide alternate methods of connecting a central measuring module to a network. Embodiments of the present inventive concept allow the connector to be customized to the module, even allowing for different connectors on a same unit.

In the drawings and specification, there have been disclosed exemplary embodiments of the inventive concept. However, many variations and modifications can be made to these embodiments without substantially departing from the principles of the present inventive concept. Accordingly, although specific terms are used, they are used in a generic and descriptive sense only and not for purposes of limitation, the scope of the inventive concept being defined by the following claims.

That which is claimed is:

1. A system for connecting a central module to a network, the system comprising:
    a central module having an inlet and an outlet;
    a first connector configured to be received at the inlet of the central module and wrap at least halfway around both sides of the central module;
    a second connector configured to be received at the outlet of the central module and wrap at least halfway around both sides of the central module; and
    at least one fastening mechanism that secures the first and second connectors to the central module by extending across a surface of both the first and second connectors such that sealed connection is provided through the central module to the network.

2. The system of claim 1, wherein the central module comprises a water meter and wherein the network comprises a water distribution network.

3. The system of claim 2, wherein the water distribution network comprises one of metal and non-metal piping and wherein the first and second connectors substantially comprise elastomeric materials that have rubber-like properties.

4. The system of claim 3, wherein the first and second connectors are different types of connectors,
wherein the first connector is configured to be received by a meter having a first length and the second connector is configured to be received by a meter having a second length, different from the first length; and/or
wherein the first connector is a standard connector having threads and the second connector is a non-standard connector without threads, different from the first connector.

5. The system of claim 1:
wherein the at least one fastening mechanism comprises a plurality of pins;
wherein the first and second connectors overlap on both sides of the central module and each comprise a plurality of openings; and
wherein the at least one fastening mechanism extends across a surface of both the first and second connectors and the plurality of pins of the at least one fastening mechanism are received by the plurality of openings in each of the first and second connectors coupling the first and second connectors to the central module.

6. The system of claim 1:
wherein one of the first and second connectors comprises a notch and a remaining one of the first and second connectors comprises a tab;
wherein the notch on the first or second connector is configured to receive the tab of the first or second connector at substantially a center of both sides of the central module so that the first and second connectors do not overlap; and
wherein to the at least one fastening mechanism extends across a surface of both the first and second connectors on both sides of the central module coupling of the first and second connectors to the central module.

7. The system of claim 1, wherein the first and second connectors are further configured to seal connections between the first and second connectors and the inlet and outlet, respectively.

8. The system of claim 7,
wherein the at least one fastening mechanism comprises a plurality of openings;
wherein the first and second connectors wrap around both sides of the central module and comprise a plurality of pins; and
wherein the at least one fastening mechanism extends across a surface of both the first and second connectors and the plurality of pins of the first and second connectors are received by the plurality of openings in at least one fastening mechanism coupling the first and second connectors to the central module.

9. The system of claim 1, wherein the first and second connectors are non-threaded connectors and wherein an O-ring is positioned with each of the first and second connectors to provide a seal.

10. The system of claim 1, wherein the first and second connectors are configured to vary a length of a connection to the network.

11. A connector for connecting a central module to a network, the connector comprising:
a non-metal or metal material configured to be received at an inlet and/or an outlet of the central module and wrap at least halfway around both sides of the central module,
wherein at least one fastening mechanism that secures the non-metal or metal connector to the central module by extending across a surface of the non-metal or metal connector such that a sealed connection is provided through the central module to the network.

12. The connector of claim 11, wherein the central module comprises a water meter and wherein the network comprises a water distribution network.

13. The connector of claim 12, wherein the water distribution network comprises non-metal piping and wherein the connector is a non-metal connector and substantially comprise elastomeric materials that have rubber-like properties.

14. The connector of claim 13, wherein connector is configured to be received by different types of non-metal piping,
wherein different types of non-metal piping include connectors configured to be received by meters having different lengths, non-standard connector without threads and standard connectors having threads.

15. The connector of claim 11:
wherein the at least one fastening mechanism comprises a plurality of pins;
wherein the connector comprises a plurality of openings; and
wherein the at least one fastening mechanism extends across a surface of the connector and the plurality of pins of the at least one fastening mechanism are received by the plurality of openings in the connector coupling the connector to the central module.

16. The connector of claim 11,
wherein the connector comprises a first connector and wherein one of the first connector and a second connector comprises a notch and a remaining one of the first and second connectors comprises a tab;
wherein the notch on the first or second connector is configured to receive the tab of the first or second connector at substantially a center of both sides of the central module so that the first and second connectors do not overlap; and
wherein to the at least one fastening mechanism extends across a surface of both the first and second connectors on both sides of the central module coupling of the first and second connectors to the central module.

17. The connector of claim 11, wherein the connector is a non-metal connector and is configured to seal a connection between the non-metal connector and the inlet and/or outlet.

18. The connector of claim 1,
wherein the at least one fastening mechanism comprises a plurality of openings;
wherein the connector comprises a plurality of pins; and
wherein the at least one fastening mechanism extends across a surface of the connector and the plurality of pins in the connector are received by the plurality of openings in the at least one fastening mechanism coupling the connector to the central module.

19. The connector of claim 11, wherein the connector is a non-threaded connector and wherein an o-ring is positioned with the connector to provide a seal.

20. The connector of claim 11, wherein the connector is configured to vary a length of a connection to the network.

* * * * *